Patented Jan. 17, 1939

2,144,424

UNITED STATES PATENT OFFICE 2,144,424

PREPARATION OF QUINONE

Alwin C. Carus, La Salle, Ill., assignor to Carus Chemical Company, a corporation of Illinois No Drawing. Application January 17, 1938,
Serial No. 185,448

3 Claims. (Cl. 260—396)

This invention relates to a process of preparing quinone and more particularly to a process of preparing it from aniline.

Quinone has long been prepared by the action of manganese dioxide and dilute sulfuric acid mixtures upon aniline, but this method does not give good yields, generally being limited to less than 88%. This is likewise true of other oxidizing agents, although in certain cases combinations of materials have been used to produce higher yields. For instance, in German Patent

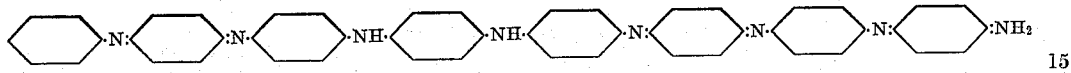

369,354, manganese dioxide and dichromate are used in succession to obtain a yield of about 90%.

It has now been discovered that yields of as much as 93 to 94% of the theoretical may be obtained by treating manganese dioxide ore with concentrated sulfuric acid at high temperatures to form a manganese sulfate in which the manganese has a valence between 2 and 4 and apparently includes a large proportion of a manganic sulfate. For this purpose it is possible to use low grade manganese ores. For example, 78 to 80% ores give as good as or a slightly better result than the high grade ores which contain 85% or more manganese dioxide.

The ore is treated with 60° Baumé sulfuric acid, and then heated preferably at a temperature of 140 to 150° C. to form a brownish solution of a manganic sulfate and manganic oxide or hydroxide. The ore should be stirred during the reaction, which is preferably carried out in a tank equipped with a stirrer for this purpose, and with a heating coil for the maintenance of the temperature desired. In preparing the sulfate, the acid is preferably added at the rate of 1 cc. of 60° Baumé acid for one gram of ore having a $MnO_2$ content of about 78 to 80%.

In producing the manganic sulfate, a catalyst is desirable, which is preferably iron or an iron salt. It is found desirable where iron is the catalyst to use about at least 1½% based on the ore. In many ores this amount of iron will be found present, but if it is not present it may be added either in iron compound or metallic iron. When iron is added to the mixture it produces considerable heat and lessens the amount of heat which must be introduced by means of the heating coil.

After the manganic sulfate has been prepared, aniline is mixed with water and sulfuric acid to form aniline sulfate in the customary manner and is then cooled to 5 to 10° C. and placed in oxidizing equipment fitted with a stirrer and a cooling coil. The ore and acid mixture is then added slowly, care being taken not to permit the temperature to rise above 10° C. After all of the ore has been added the mixture is agitated for several hours to complete the oxidation.

During the addition of the oxide-sulfuric acid mixture to the aniline sulfate, the reaction mass frequently turns green, indicating the formation of the following compound:

If care is taken to produce this stage of the reaction, the remainder of the oxidation may be carried out with more powerful oxidizing agents than the manganic sulfate solution. For example, manganese dioxide can be employed for the completion of the oxidation, or such an oxidizer as lead dioxide may be used without affecting the yield.

As an example of the process, 1400 parts of manganese dioxide ore of the following composition

| | Per cent |
|---|---|
| $MnO_2$ | 76.88 |
| Mn | 53.68 |
| $Fe_2O_3$ | 1.95 |
| $SiO_2$ | .42 | was mixed with 2380 parts of 60° Baumé sulfuric acid and heated at 140° C. with constant stirring for a period of two and one-half hours. The resulting brown solution was then cooled and added to a cool mixture of 400 parts of aniline with 250 parts of 60° sulfuric acid and 2800 parts of water. The addition was carried out very slowly, the temperature being maintained below 10° C. continually. When the addition was complete, the mixture was allowed to be agitated for several hours.

The quinone was then separated in the customary manner and a yield of 433 parts of quinone or 93.2% of theoretical obtained.

The foregoing detailed description has been given for clearness of understanding only and no unnecessary limitations should be understood therefrom, but the appended claims should be construed as broadly as permissible in view of the prior art.

I claim:

1. The method of preparing quinone which comprises treating aniline sulfate with a manganese dioxide ore containing about 2% of iron (calculated as $Fe_2O_3$) and sulfuric acid.

2. The method of preparing quinone which comprises treating aniline sulfate with manganese dioxide ore in the presence of about 2% of iron (calculated as $Fe_2O_3$) based on the weight of the ore and sulfuric acid.

3. The method of preparing quinone which comprises treating aniline sulfate with a manganese dioxide ore in the presence of at least 1½% iron (calculated as $Fe_2O_3$) based on the weight of the ore and sulfuric acid.

ALWIN C. CARUS.